United States Patent
Fan et al.

(10) Patent No.: US 7,565,346 B2
(45) Date of Patent: Jul. 21, 2009

(54) SYSTEM AND METHOD FOR SEQUENCE-BASED SUBSPACE PATTERN CLUSTERING

(75) Inventors: Wei Fan, New York, NY (US); Haixun Wang, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/858,541

(22) Filed: May 31, 2004

(65) Prior Publication Data

US 2005/0278324 A1    Dec. 15, 2005

(51) Int. Cl.
G06F 17/30    (2006.01)
(52) U.S. Cl. .......................................................... 707/6
(58) Field of Classification Search ................... None
See application file for complete search history.

(56) References Cited

U.S. PATENT DOCUMENTS

| | | | | |
|---|---|---|---|---|
| 6,003,029 | A * | 12/1999 | Agrawal et al. | 707/7 |
| 6,138,117 | A * | 10/2000 | Bayardo | 707/6 |
| 6,408,295 | B1 * | 6/2002 | Aggarwal et al. | 707/6 |
| 6,434,488 | B1 * | 8/2002 | Robson | 702/19 |
| 7,246,125 | B2 * | 7/2007 | Bradley et al. | 707/100 |
| 2003/0097356 | A1 * | 5/2003 | Lee et al. | 707/3 |
| 2003/0175722 | A1 * | 9/2003 | Mann et al. | 435/6 |
| 2003/0220771 | A1 * | 11/2003 | Vaidyanathan et al. | 703/2 |
| 2004/0068332 | A1 * | 4/2004 | Ben-Gal et al. | 700/51 |
| 2005/0171948 | A1 * | 8/2005 | Knight | 707/6 |

OTHER PUBLICATIONS

Wang, Haixun, Wei Wang, Jiong Yang and Philip S. Yu. "Clustering by Pattern Similarity in Large Data Sets." International Conference on Management of Data: Proceedings of the 2002 ACM SIGMOD International Conference on Management of Data. New York: ACM Press, 2002.*

Alison Abbott, "Bioinformatics institute plans public database for gene expression data", Nature, vol. 398, Apr. 22, 1999.

(Continued)

*Primary Examiner*—John R. Cottingham
*Assistant Examiner*—Kimberly Lovel
(74) *Attorney, Agent, or Firm*—Ference & Associates LLC

(57) ABSTRACT

Unlike traditional clustering methods that focus on grouping objects with similar values on a set of dimensions, clustering by pattern similarity finds objects that exhibit a coherent pattern of rise and fall in subspaces. Pattern-based clustering extends the concept of traditional clustering and benefits a wide range of applications, including e-Commerce target marketing, bioinformatics (large scale scientific data analysis), and automatic computing (web usage analysis), etc. However, state-of-the-art pattern-based clustering methods (e.g., the pCluster algorithm) can only handle datasets of thousands of records, which makes them inappropriate for many real-life applications. Furthermore, besides the huge data volume, many data sets are also characterized by their sequentiality, for instance, customer purchase records and network event logs are usually modeled as data sequences. Hence, it becomes important to enable pattern-based clustering methods i) to handle large datasets, and ii) to discover pattern similarity embedded in data sequences. There is presented herein a novel method that offers this capability.

3 Claims, 10 Drawing Sheets

RAW DATA:
3 OBJECTS, 10 COLUMNS

OTHER PUBLICATIONS

C. C. Aggarwal, J. L. Wolf, C. Procupiuc, J. S. Park, "Fast algorithms for projected clustering", SIGMOND, 1999.

C. Aggarwal, P. S. Yu, "Finding Generalized Projected Clusters in High Dimensional Spaces", SIGMOND, pp. 70-81, 2000.

R. Agrawal, J. Gehrke, D. Gunopulos, P. Rahhavan, Automatic Subspace Clustering of High Dimensional Data for Data Mining Applications, SIGMOD, 1998.

A. Brazma, A. Robinson, G. Cameron, M. Ashburner, "One-stop shop for microarray data", Nature, vol. 403, Feb. 27, 2000.

P. Brown, D. Botstein, "Exploring the new world of the genome with DNA microarrays", Nature Genetics Supplement, vol. 21, Jan. 1999.

C. H. Cheng, A. W. Fu, Y Zhang, "Entropy-based subspace clustering for mining numerical data", SIGKDD, pp. 84-93, 1999.

Y. Cheng, G. Church, "Biclustering of expression data", In Proc. of 8th International Conference on Intelligent System for Molecular Biology, 2000.

P. D'haeseleer, S. Liang, R. Somogyi, "Gene Expression Data Analysis and Modeling", In Pacific Symposium on Biocomputing, 1999.

R. Miki et al, "Delineating developmental and metabolic pathways in vivo by expression profiling using the riken set of 18,816 full-length enriched mouse CDNA arrays", In Proceedings of National Academy of Sciences, vol. 98, No. 5, Feb. 27, 2001, pp. 2199-2204.

In Proceedings of National Academy of Science, vol. 98, No. 5, Feb. 27, 2004, pp. 2199-2204.

H. Jagadisn, J. Madar, R. Ng, "Semantic Compression and Pattern Extraction with Fascicles", Proceedings of the 25th VLDB Confernece, pp. 186-196, 1999.

J. Liu and W. Wang, "Op-Cluster: Clustering by tendency in high dimensional space", in submitted for review, 2003.

J. Pei, X. Zhang, M. Cho, "MaPle: A Fast Algorithm for Maximal Pattern-based Clustering", In Submitted for Review, 2003.

C.-S. Perng, H. Wang, S. Ma, J. Hellerstein, "FARM: A framework for exploring mining spaces with multiple attributes", In ICDM, 2001.

http://arep.med.harvard.edu/biclustering/yeast.matrix.

H. Wang, W. Wang, J. Yang, P. Yu, "Clustering by Pattern Similarity in Large Data Sets", in SIGMOD, 2002.

J. Yang, W. Wang, H. Wang, P. Yu, "Clusters: Capturing Subspace Correlation in a Large Data Set", In ICDE, pp. 517-528, 2002.

* cited by examiner

RAW DATA:
3 OBJECTS, 10 COLUMNS

A SHIFTING PATTERN IN
SUBSPACE {B,C,H,J,E}

THE MEANING OF $DIST_{K,S}(X,Y) \leq \delta$

PATTERN GRIDS FOR SUBSPACE $\{t_1, t_2, t_3\}$

THE COUNTING TREE

THE CLUSTER TREE

PERFORMANCE STUDY: SCALABILITY

SCALABILITY WITH THE NUMBER OF ROWS IN DATA SETS

PERFORMANCE STUDY: SCALABILITY

SCALABILITY WITH THE NUMBER OF COLUMNS IN DATA SETS

TIME VS. DISTANCE THRESHHOLD $\delta$

SCALABILITY ON SEQUENTIAL DATASET

A CLUSTER IN SUBSPACE
{2,3,4,5,7,8,10,11,12,13,14,15,16}

SYSTEM AND METHOD FOR SEQUENCE-BASED SUBSPACE PATTERN CLUSTERING

FIELD OF THE INVENTION

The present invention generally relates to subspace clustering methods and arrangements.

BACKGROUND OF THE INVENTION

Herebelow, numerals in brackets—[ ]—are keyed to the list of references found towards the end of the instant disclosure.

Clustering large datasets is a challenging data mining task with many real life applications. Much research has been devoted to the problem of finding subspace clusters [2, 3, 4, 7, 11]. In this general, the concept of clustering has further been extended to focus on pattern-based similarity [16]. Several research efforts have since studied clustering based on pattern similarity [17, 13, 12], as opposed to traditional value-based similarity.

These efforts generally represent a step forward in bringing the techniques closer to the demands of real life applications, but at the same time, they have also introduced new challenges. For instance, the clustering models in use [16, 17, 13, 12] are often too rigid to find objects that exhibit meaningful similarity, and also, the lack of an efficient algorithm makes the model impractical for large scale data. Accordingly, a need has been recognized in connection with providing a clustering model which is intuitive, capable of capturing subspace pattern similarity effectively, and is conducive to an efficient implementation.

The concept of subspace pattern similarity is presented by way of example in FIGS. 1(a)-1(c). Shown are three objects. Here, the X axis represents a set of conditions, and the Y axis represents object values under those conditions. In FIG. 1(a), the similarity among the three objects is not visibly clear, until they are studied under two subsets of conditions. In FIG. 1(b), one finds the same three objects form a shifting pattern in subspace {b, c, h, j, e}, and in FIG. 1(c), a scaling pattern in subspace {f,d,a,g,i}.

Accordingly, one should preferably consider objects similar to each other as long as they manifest a coherent pattern in a certain subspace, regardless of whether their coordinate values in such subspaces are close or not. It also means many traditional distance functions, such as Euclidean, cannot effectively discover such similarity.

A need has been recognized in connection with addressing the problems discussed above in at least three specific areas: e-Commerce (target marketing); automatic computing (time-series data clustering by pattern similarity); and bioinformatics (large scale scientific data analysis).

First, recommendation systems and target marketing are important applications in the e-Commerce area. In these applications, sets of customers/clients with similar behavior need to be identified so that one can predict customers' interest and make proper recommendations. One may consider the following example. Three viewers rate four movies of a particular type (action, romance, etc.) as (1, 2, 3, 6), (2, 3, 4, 7), and (4, 5, 6, 9), where 1 is the lowest and 10 is the highest score. Although the rates given by each individual are not close, these three viewers have coherent opinions on the four movies, which can be of tremendous benefit if optimally handled and analyzed.

Next, scientific data sets usually involve many numerical columns. One such example is the gene expression data. DNA micro-arrays are an important breakthrough in experimental molecular biology, for they provide a powerful tool in exploring gene expression on a genome-wide scale. By quantifying the relative abundance of thousands of mRNA transcripts simultaneously, researchers can discover new functional relationships among a group of genes [6, 9, 10].

Investigations show that more often than not, several genes contribute to one disease, which motivates researchers to identify genes whose expression levels rise and fall coherently under a subset of conditions, that is, they exhibit fluctuation of a similar shape when conditions change [6, 9, 10]. Table 1 (all tables appear in the Appendix hereto) shows that three genes, VPS8, CYS3, and EFB1, respond to certain environmental changes coherently.

More generally, with the DNA micro-array as an example, it can be argued that the following queries are of interest in scientific data analysis.

EXAMPLE 1

Counting

How many genes whose expression level in sample CH11 is about 100±5 units higher than that in CH2B, 280±5 units higher than that in CHID, and 75±5 units higher than that in CH21?

EXAMPLE 2

Clustering

Find clusters of genes that exhibit coherent subspace patterns, given the following constraints: i) the subspace pattern has dimensionality higher than minCols; and ii) the number of objects in the cluster is larger than minRows.

Answering the above queries efficiently is important in discovering gene correlations [6, 9] from large scale DNA micro-array data. The counting problem of Example 1 seems easy to implement, yet it constitutes the most primitive operation in solving the clustering problem of Example 2, which is the focus of this paper.

Current database techniques cannot solve the above problems efficiently. Algorithms such as the pCluster [16] have been proposed to find clusters of objects that manifest coherent patterns. Unfortunately, they can only handle datasets containing no more than thousands of records. On the other hand, it is widely believed that we will be facing an explosion of gene expression data that may dwarf even the human genome sequencing projects [1, 5]. Management of such data is becoming one of the major bottlenecks in the utilization of the micro-array technology.

Finally, pattern similarity is introduced for datasets of tabular form. However, many real life data sets are characterized by their sequentiality, for instance, customer purchase records and network event logs are usually modeled as data sequences.

Network event logs can be used to demonstrate the need to find clusters based on sequential patterns in large datasets. A network system generates various events. One may preferably log each event, as well as the environment in which it occurs, into a database. Finding patterns in a large dataset of event logs is important to the understanding of the temporal causal relationships among the events, which often provide actionable insights for determining problems in system management.

One may preferably focus on two attributes, Event and Timestamp (Table 2), of the log database. A network event pattern contains multiple events. For instance, a candidate pattern might be the following:

EXAMPLE 3

Sequential Pattern

Event CiscoDCDLinkUp is followed by MLMStatusUp that is followed, in turn, by CiscoDCDLinkUp, under the constraint that the interval between the first two events is about 20±2 seconds, and the interval between the 1st and 3rd events is about 40±2 seconds.

A network event pattern becomes interesting if: i) it occurs frequently, and ii) it is non-trivial, meaning it-contains a certain amount of events. The challenge here is to find such patterns efficiently.

Although seemingly different from the problem shown in FIG. 1, finding patterns exhibited over the time in sequential data is closely related to finding coherent patterns in tabular data. It is another form of clustering by subspace pattern similarity: if one thinks of different type of events as conditions on the X axis of FIG. 1, and their timestamp as the Y axis, then, one is actually looking for clusters of subsequences that exhibit (time) shifting patterns as in FIG. 1($b$).

In sum, in view of the foregoing, evolving needs have been recognized in connection with improving upon the shortcomings and disadvantages presented by known methods and arrangements.

SUMMARY OF THE INVENTION

There is broadly contemplated herein an approach for clustering datasets based on pattern similarity.

Particularly, there is broadly contemplated herein a novel model for subspace pattern similarity. In comparison with previous models, the new model is intuitive for capturing subspace pattern similarity, and reduces computation complexity dramatically.

Further, there is broadly contemplated herein the unification of pattern similarity analysis in tabular data and pattern similarity analysis in sequential data into a single problem. Indeed, tabular data are transformed into their sequential form which is inducive to an efficient implementation.

Additionally, there is broadly contemplated herein a scalable sequence-based method, SeqClus, for clustering by subspace pattern similarity. The technique outperforms all known state-of-the-art pattern clustering algorithms and makes it feasible to perform pattern similarity analysis on large dataset.

In summary, one aspect of the invention provides an apparatus for facilitating subspace clustering, the apparatus comprising: an arrangement for accepting input data; an arrangement for discerning pattern similarity in the input data; and an arrangement for clustering the data on the basis of discerned pattern similarity; the arrangement for discerning pattern similiarity comprising an arrangement for discerning pattern similiarity among both tabular data and sequential data contained in the input data.

Another aspect of the invention provides a method of facilitating subspace clustering, the method comprising the steps of: accepting input data; discerning pattern similarity in the input data; and clustering the data on the basis of discerned pattern similarity; said discerning step comprising discerning pattern similiarity among both tabular data and sequential data contained in the input data.

Furthermore, an additional aspect of the invention provides a program storage device readable by machine, tangibly embodying a program of instructions executable by the machine to perform method steps for facilitating subspace clustering, the method comprising the steps of: accepting input data; discerning pattern similarity in the input data; and clustering the data on the basis of discerned pattern similarity; the discerning step comprising discerning pattern similiarity among both tabular data and sequential data contained in the input data.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

The choice of distance functions has great implications on the meaning of similarity, and this is particularly important in subspace clustering because of computational complexity. Hence, there is broadly contemplated in accordance with at least one preferred embodiment of the present invention a distance function that makes measuring of the similarity between two objects in high dimensional space meaningful and intuitive, and at the same time yields to an efficient implementation.

Finding objects that exhibit coherent patterns of rise and fall in a tabular dataset (e.g. Table 1) is similar to finding subsequences in a sequential dataset (e.g. Table 2). This indicates that one should preferably unify the data representation of tabular and sequential datasets so that a single similarity model and algorithm can apply to both tabular and sequential datasets for clustering based on pattern similarity.

Preferably, sequences are used to represent objects in a tabular dataset $\mathbb{D}$. It is assumed that here is a total order among its attributes. For instance, let $A = \{c_1, \ldots, c_n\}$ be the set of attributes. It is also assumed that $c_1 \prec \ldots \prec c_n$ is the total order. Thus, one can represent any object x by a sequence:

$$\langle (c_1, x_{c_1}), \ldots, (c_n, x_{c_n}) \rangle$$

where $x_{c_j}$ is the value of x in column $c_j$. One can then concatenate objects in D into a long sequence, which is a sequential representation of the tabular data. (One may also use $\langle x_{c_1}, \ldots, x_{c_n} \rangle$ to represent x if no confusion arises.)

After the conversion, pattern discovery on tabular datasets is no different from pattern discovery in a sequential dataset. For instance, in the Yeast DNA micro-array, one can use the following sequence to represent a pattern:

$$\langle (CH1D, 0), (CH2B, 180), (CH2I, 205), (CH1I, 280) \rangle$$

To express this in words, for genes that exhibit this pattern, their expression levels under condition CH2B, CH2I, and CH1I must be 180, 205, 280 units higher than that under CH1D.

There is broadly contemplated in accordance with at least one preferred embodiment of the present invention a new distance measure that is capable of capturing subspace pattern similarity and is conducive to an efficient implementation.

Figure 1A:
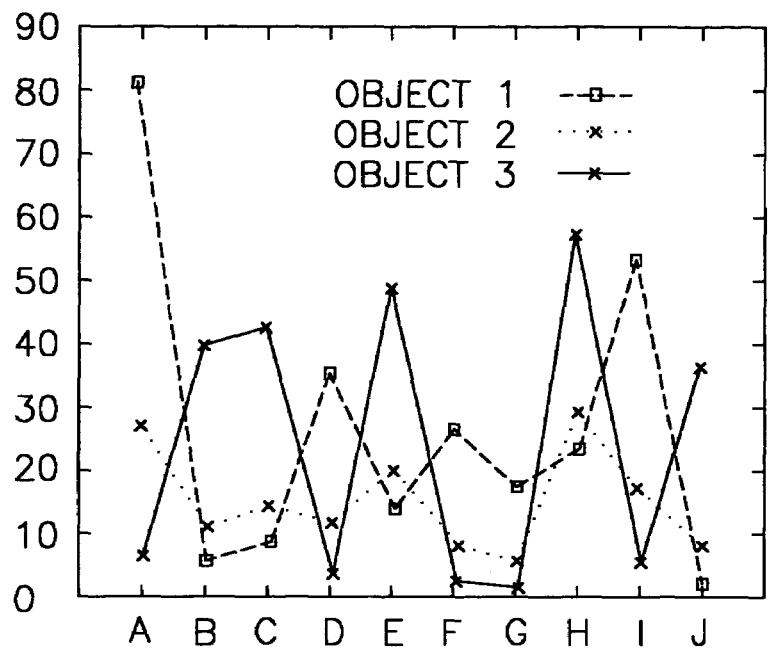
FIGS. 1($a$)-1($c$) are graphs relating to the formation of patterns by objects in subspaces.
Figure 1B:
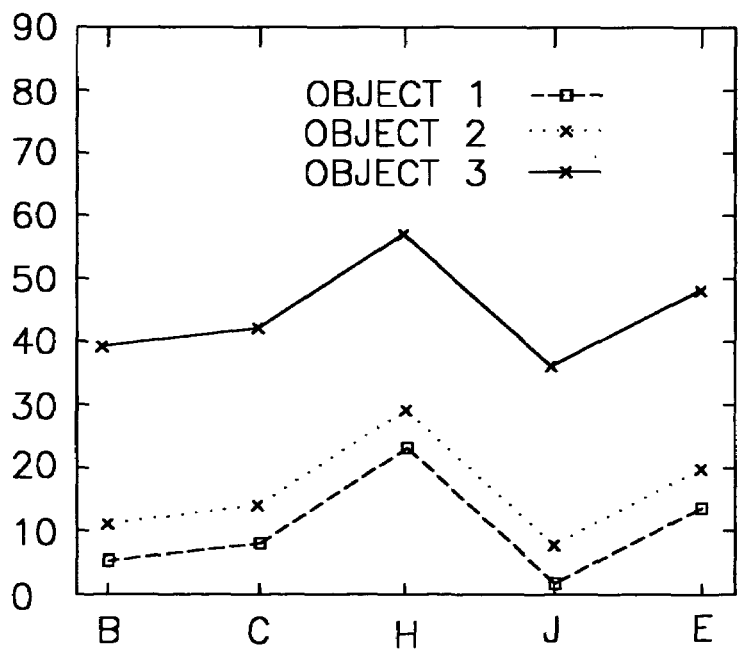
Figure 1C:
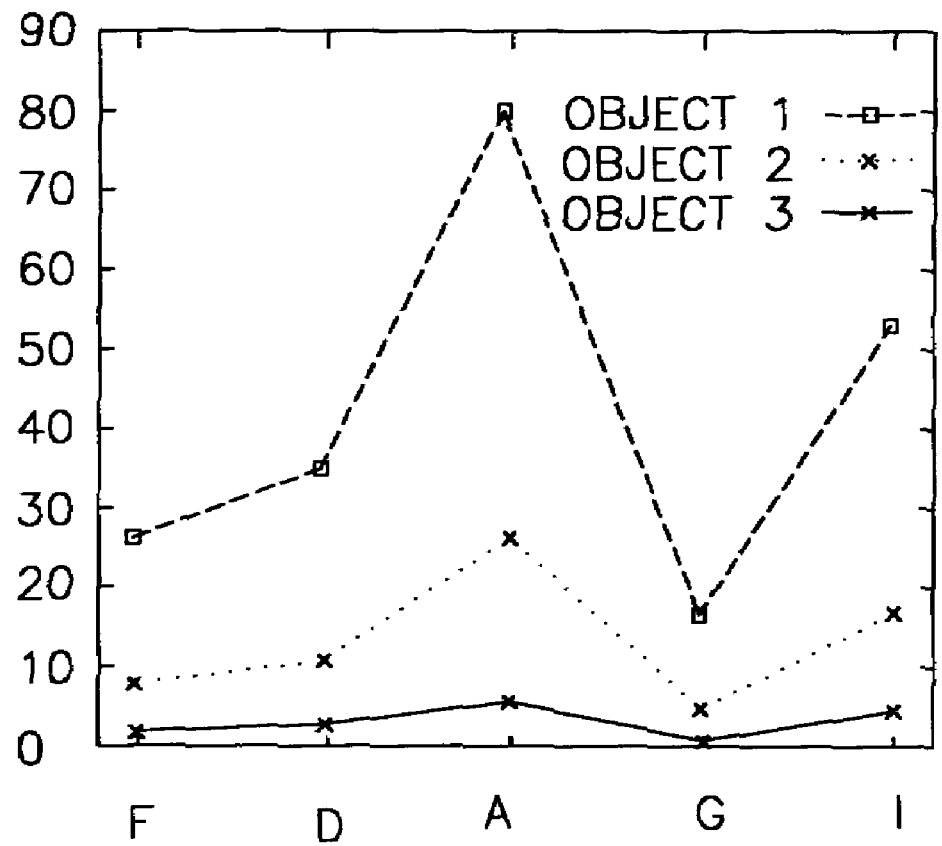

Here, only the shifting pattern of FIG. 1($b$) is considered, as scaling patterns are equivalent to shifting patterns after a logarithmic transformation of the data.

To tell whether two objects exhibit a shifting pattern in a given subspace $s$, the simplest way is to normalize the two objects by subtracting $\bar{x}_s$ from each of their coordinate value $x_i (i \in s)$, where $\bar{x}_s$ is the average coordinate value of x in subspace $s$. This, however, requires one to compute and keep track of $\bar{x}_s$ for each subspace $s$. As there are as many as $2^{|A|}-1$ different ways of normalization, it makes the computation of such similarity model impractical for large datasets.

To find a distance function that is conducive to an efficient implementation, one may choose an arbitrary dimension $k \in s$ for normalization. It can be shown that the choice of k has very limited impact on the similarity measure.

More formally, given two objects x and y, a subspace $s$, a dimension $k \in s$, one defines the sequence-based distance between x and y as follows:

$$dist_{k,S}(x, y) = \max_{i \in S}|(x_i - y_i) - (x_k - y_k)| \quad (1)$$

Figure 2:
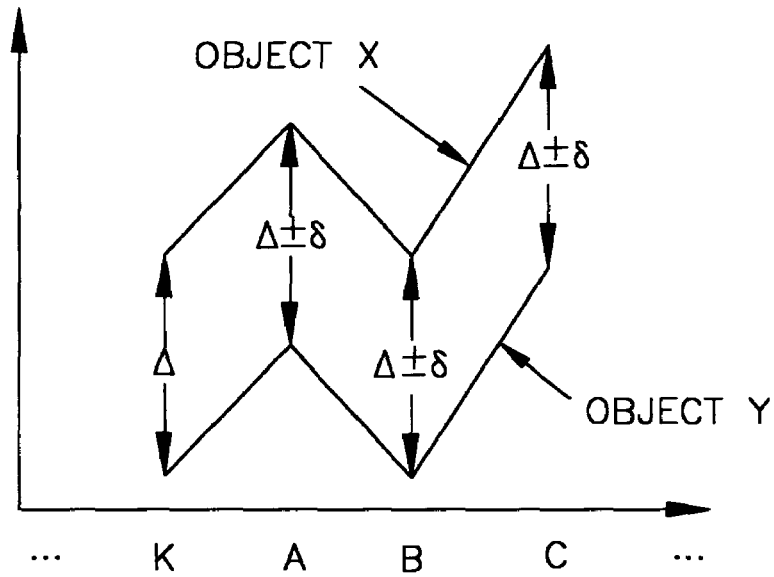
FIG. 2 is a graph relating to a function definition.

FIG. 2 demonstrates the intuition behind Eq (1). Let $s=\{k, a, b, c\}$. With respect to dimension k, the distance between x and y in $s$ is less than δ if the difference between x and y on any dimension of $s$ is within $\Delta \pm \delta$, where Δ is the difference of x and y on dimension k.

Clearly, with a different choice of dimension k, one may find the distance between two objects different. However, such different is bounded by a factor of 2, as is shown by the following property.

Property 1. For any two objects x, y, and a subspace $s$, if $\exists k \in s$ such that $dist_{k,S}(x,y) \leq \delta$, then $\forall j \in S, dist_{j,S}(x,y) \leq 2\delta$.

Proof.

$$\begin{aligned} dist_{j,S}(s, y) &= \max_{i \in S}|(x_i - y_i) - (x_j - y_j)| \\ &< \max_{i \in S}|(x_i - y_i) - (x_k - y_k)| + \\ &\quad \max_{j \in S}|(x_j - y_j) - (x_k - y_k)| \\ &\leq 2\delta \end{aligned}$$

Since δ is but a user-defined threshold, Property 1 shows that Eq (1)'s capability of capturing pattern similarity does not depend on the choice of k, which can be an arbitrary dimension in $s$. As a matter of fact, as long as one uses a fixed dimension k for any given subspace $s$, then, with a relaxed δ, one can always find those clusters discovered by Eq (1) where a different dimension k is used. This gives one great flexibility in defining and mining clusters based on subspace pattern similarity.

Turning to a clustering algorithm, the concept of pattern is first defined herebelow and then the pattern space is divided into grids. A tree structure is then constructed which provides a compact summary of all of the frequent patterns in a data set.

It is shown that the tree structure enables one to find efficiently the number of occurrences of any specified pattern, or equivalently, the density of any cell in the grid. A density and grid based clustering algorithm can then be applied to merge dense cells into clusters. Finally, there is introduced an Apriori-like method to find clusters in any subspace.

Let $\mathbb{m}$ be a dataset in a multidimensional space A. A pattern p is a tuple (T,δ), where δ is a distance threshold and T is an ordered sequence of (column, value) pairs, that is, $$T = \langle (t_1, 0), (t_2, v_2), \ldots, (t_k, v_k) \rangle$$

where $t_i \in A$, and $t_1 \prec \ldots \prec t_k$. Let $s = \{t_1, \ldots, t_k\}$. An object $x \in \mathbb{m}$ exhibits pattern p in subspace $s$ if $$v_i - \delta \leq x_{t_i} - x_{t_1} \leq v_i + \delta, \quad 1 \leq i \leq k \quad (2)$$

Apparently, if two objects $x, y \in \mathbb{m}$ are both instances of pattern p=(T,δ), then one has $$dist_{k,S}(x,y) \leq 2\delta.$$

In order to find clusters, we start with high density patterns: a pattern p=(T,δ) is of high density if given p, the number of objects that satisfy Eq (2) reaches a user-defined density threshold.

Figure 3:
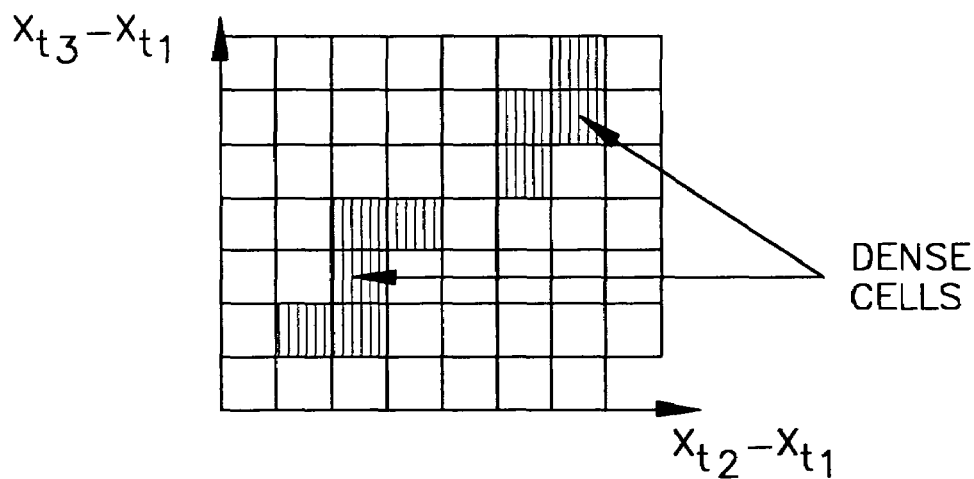
FIG. 3 is a representation of pattern grids for a subspace.

Preferably, the dataset is discretized so that patterns fall into grids. For any given subspace $s$, after one finds the dense cells in $s$, there is preferably employed a grid and density based clustering algorithm to find the clusters (FIG. 3).

The difficult part, however, lies in finding the dense cells efficiently for all subspaces. Further discussion herebelow deals with this issue.

A counting tree provides a compact summary of the dense patterns in a dataset. It is motivated by the suffix trie, which, given a string, indexes all of its substrings. Here, each record in the dataset is represented by a sequence, but sequences are different from strings, as the interest is essentially in non-contiguous sub-sequence match, while suffix tries only handle contiguous substrings.

Before introducing the structure of the counting tree, by way of example, Table 3 shows a dataset of 3 objects in a 4 dimensional space. Preferably, one starts with the relevant subsequences of each object.

Definition 1. Relevant Subsequences.

The relevant subsequences of an object o in an n-dimensional space are:

$$x^i = \langle x_{i+1} - x_i, \ldots, x_n - x_i \rangle 1 \leq i < n$$

In relevant subsequence $x^i$, column $c_i$ is used as the base for comparison. S, wherein i is the minimal dimension, we shall search for C in dataset $\{x^i | \forall x \in \mathbb{m}\}$. In any such subspace $s$, one preferably uses $c_i$ as the base for comparison; in other words, $c_i$ serves as the dimension k in Eq (1). As an example, the relevant subsequences of object z in Table 3 are:

|       | $c_1$ | $c_2$ | $c_3$ | $c_4$ |
|-------|-------|-------|-------|-------|
| $z^1$ |       | 1     | 2     | 0     |
| $z^2$ |       |       | 1     | -1    |
| $z^3$ |       |       |       | -2    |

To create a counting tree for a dataset $\mathbb{m}$, for each object $z \in \mathbb{m}$, insert its relevant subsequences into a tree structure. Also, assuming the insertion of a sequence, say $z^1$, ends up at node t in the tree (FIG. 4), increase the count associated with node t by 1.

Figure 4:
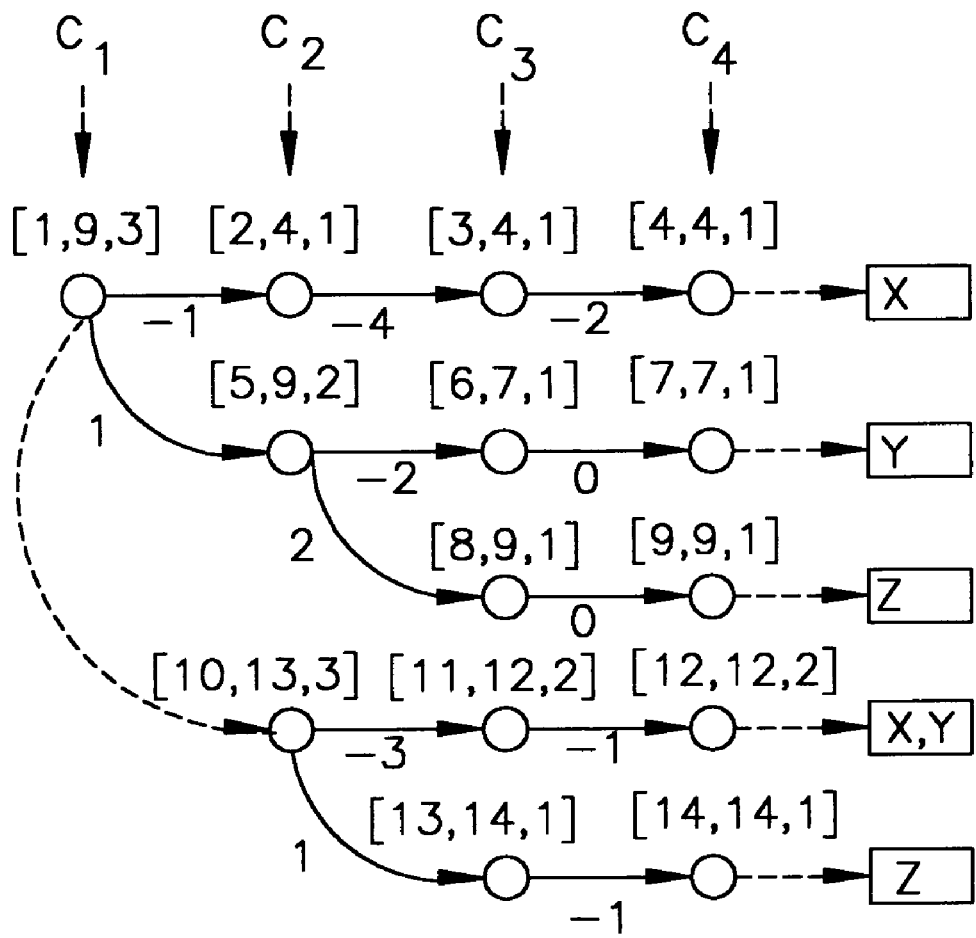
FIG. 4 schematically illustrates a counting tree.

More often than not, the interest is in patterns equal to or longer than a given size, say $\xi \geq 1$. A relevant subsequence whose length is shorter than $\xi$ cannot contain patterns longer than $\xi$. Thus, if $\xi$ is known beforehand, one only needs to insert $x^i$ where $1 \leq i < n - \xi + 1$ for each object x. FIG. 4 shows the counting tree for the dataset of Table 3 where $\xi = 2$.

In the second step, label each tree node t with a triple: $(ID^-, ID^\dashv, Count)$. The first element of the triple, $ID^-$, uniquely identifies node t, and the second element, $ID^\dashv$, is the largest $ID^-$ of t's descendent nodes. The IDs are assigned by a depth-first traversal of the tree structure, during which one preferably assigns sequential numbers (starting from 0, which is assigned to the root node) to the nodes as they are encountered one by one. If t is a leaf node, then the 3rd element of the triple, Count, is the number of objects in t's object set, otherwise, it is the sum of the counts of its child nodes. Apparently, one can label a tree with a single depth-first traversal. FIG. 4 shows a labeled tree for the sample dataset.

To count pattern occurrences using the tree structure, there are preferably introduced counting lists. For each column pair $(c_i, c_j)$, $i < j$, and each possible value $v = x_j - x_i$ (after data discretization), create a counting list $(c_i, c_j, v)$. The counting lists are also constructed during the depth-first traversal. Suppose during the traversal, one encounters node t, which represents sequence element $x_j - x_i = v$. Assuming t is to be labeled $(ID^-, ID^\dashv, cnt)$, and the last element of counting list $(c_i, c_j, v)$ is $(-, -, cnt')$, one preferably appends a new element $(ID^-, ID^\dashv, cnt + cnt')$ into the list. (If list $(c_i, c_j, v)$ is empty, then make $(ID^-, ID^\dashv, Count)$ the first element of the list.)

| link head | | list of node labels |
|---|---|---|
| ... | | ... |
| $(c_1, c_3, -4)$ | ⇒ | [3, 4, 1] |
| ... | | ... |
| $(c_1, c_4, -2)$ | ⇒ | [4, 4, 1] |
| $(c_1, c_4, 0)$ | ⇒ | [7, 7, 1], [9, 9, 2] |
| $(c_2, c_4, -1)$ | ⇒ | [12, 12, 2], [14, 14, 3] |
| ... | | ... |

Above is a part of the counting lists for the tree structure in FIG. 4. For instance, link $(c_2, c_4, -1)$ contains two nodes, which are created during the insertion of $x^2$ and $z^2$ (relevant subsequences of x and z in Table 3). The two nodes represent element $x_4 - x_2 = -1$ and $z_4 - z_2 = -1$ in sequence $x^2$ and $z^2$ respectively. The process of building the counting tree is summarized in Algorithm 1 (all algorithms appear in the Appendix hereto).

Thus, the counting tree is composed of two structures, the tree and the counting lists. One can observe the following properties of the counting tree:

1. For any two nodes x, y labeled $(ID_x^-, ID_x^\dashv, Count_x)$ and $(ID_y^-, ID_y^\dashv, Count_y)$ respectively, node y is a descendent of node x if $ID_y^- \in [ID_x^-, ID_x^\dashv]$.
2. Each node appears once and only once in the counting lists.
3. Nodes in any counting list are in ascending order of their $ID^-$.

These properties are important in finding the dense patterns efficiently, as presented herewbelow.

Herebelow, there is described "SeqClus", an efficient algorithm for finding the occurrence number of a specified pattern using the counting tree structure introduced above.

Each node s in the counting tree represents a pattern p, which is embodied by the path leading from the root node to t. For instance, the node s in FIG. 4 represents pattern $\langle (c_1, 0), (c_2, 1) \rangle$. How can one find the number of occurrence of pattern p' which is one element longer than p? That is, $$p' = \underbrace{\langle (c_i, v_i), \ldots, (c_j, v_j)}_{p}, (c_k, v) \rangle.$$

The counting tree structure makes this operation very easy. First, one only needs to look for nodes in counting list $(c_i, c_k, v)$, since all nodes of $x_k - x_i = v$ are in that list. Second, the interest is essentially in nodes that are under node s, because only those nodes satisfy pattern p, a prefix of p'. Assuming s is labeled $(ID_s^-, ID_s^\dashv, count)$, we know s's descendent nodes are in the range of $[ID_s^-, ID_s^\dashv]$. According to the counting properties, elements in any counting list are in ascending order of their $ID^-$ values, which means one can binary-search the list. Finally, assume list $(c_i, c_k, v)$ contain the following nodes:

$$\ldots, (-, -, cnt_u), \underbrace{(id_v^-, id_v^\dashv, cnt_v), \ldots, (id_w^-, id_w^\dashv, cnt_w)}_{[ID_s^-, ID_s^\dashv]}, \ldots$$

Then, it is known altogether that there are $cnt_w - cnt_u$ objects (or just $cnt_w$ objects if $id_v^-$ is the first element of the list) that satisfy pattern p'.

One may denote the above process by $count(r, c_k, v)$, where r is a range, and in this case $r = [ID_s^-, ID_s^\dashv]$. If, however, one is looking for patterns even longer than p', then instead of returning $cnt_w - cnt_u$, one preferably shall continue the search. Let L denote the list of the sub-ranges represented by the nodes within range $[ID_s^-, ID_s^\dashv]$ in list $(c_i, c_k, v)$, that is, $$L = \{[id_v^-, id_v^\dashv], \ldots, [id_w^-, id_w^\dashv]\}$$

Then, repeat the above process for each range in L, and the final count comes to $$\sum_{r \in L} count(r, c, v)$$

Turning now to clustering, the counting algorithm hereinabove finds the number of occurrences of a specified pattern, or the density of the cells in the pattern grids of a given subspace (FIG. 3). One can then use a density and grid based clustering algorithm to group the dense cells together.

Start with patterns containing only two columns (in a 2-dimensional subspace), and grow the patterns by adding new columns into them. During this process, patterns that correspond to no more than minRows objects are pruned, as introducing new columns into the pattern will only reduce the number of objects.

Figure 5:
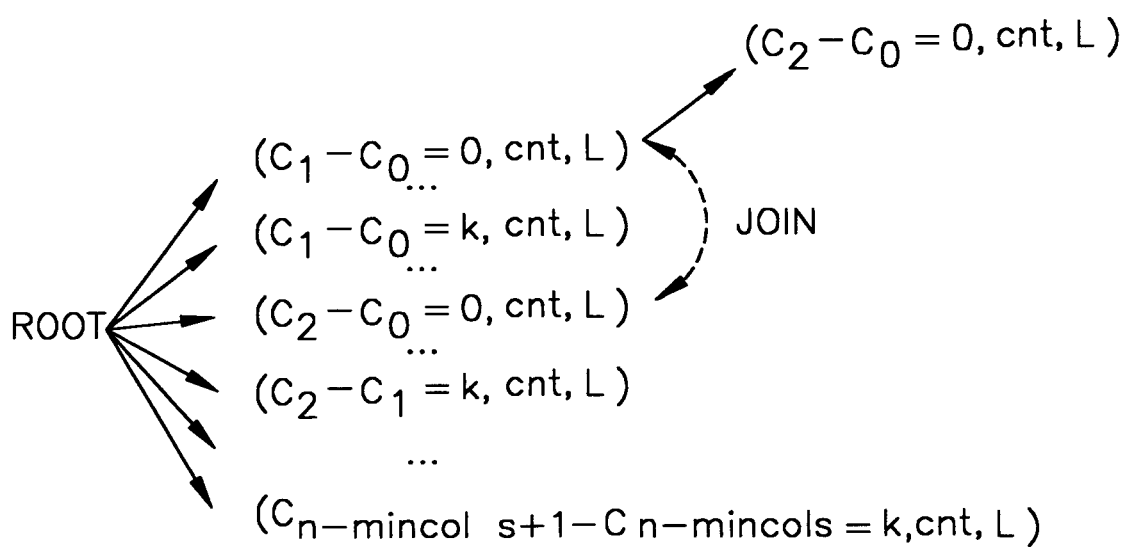
FIG. 5 schematically illustrates a cluster tree.

FIG. 5 shows a tree structure for growing the clusters. Each node t in the tree is a triple (item, count, range-list). The items in the nodes along the path from the root node to node t constitutes the pattern represented by t. For instance, the node in the 3rd level in FIG. 5 represents $\langle (c_0, 0), (c_1, 0), (c_2, 0) \rangle$, a pattern in a 3-dimensional space. The value count in the triple represents the number of occurrences of the pattern in the dataset, and range-list is the list of ranges of the IDs of those objects. Both count and range-list are computed by the count ( ) routine in Algorithm 2.

First of all, count the occurrences of all patterns containing 2 columns, and insert them under the root node if they are frequent (count≧minrows). Note there is no need to consider all the columns. As any $c_i-c_j=v$ to be the first item in a pattern with at least minCols columns, $c_i$ must be less than $c_{n-minCols+1}$ and $c_j$ must be less than $c_{n-minCols}$.

In the second step, for each node p on the current level, join p with its eligible nodes to derive nodes on the next level. A node q is node p's eligible nodes if it satisfies the following criteria:

q is on the same level as p;
if p denotes item a–b=v and q denotes c–d=v', then a≺c,b=d.

Besides p's eligible nodes, we also join p with item in the form of $c_{n-minCols+k}$–b=v, since column $c_{n-minCols+k}$ does not appear in levels less than k.

The join operation is easy to perform. Assume p, represented by triple (a–b=v, count, range-list), is to be joined with item c–b=v', we simply compute count(r,c,v') for each range r in range-list. If the sum of the returned counts is larger than minRows, then insert a new node (c–b=v',count',range-list') under p, where count' is the sum of the returned counts, and range-list' is the union of all the ranges returned by count ( ). Algorithm 3 summarizes the clustering process described above.

In experimentation, the algorithms in C were implemented on a Linux machine with a 700 MHz CPU and 256 MB main memory. It was tested on both synthetic and real life data sets. An overview of the experimentation is provided herebelow.

Synthetic datasets are generated in tabular and sequential forms. For real life datasets, there are preferably used use time-stamped event sequences generated by a production network (sequential data), and DNA micro-arrays of yeast and mouse gene expressions under various conditions (tabular data).

With regard to tabular forms, initially, the table is filled with random values ranging from 0 to 300, and then there are embedded a fixed number of clusters in the raw data. The clusters embedded can also have varying quality. Perfect clusters are embedded in the matrix, i.e., the distance between any two objects in the embedded cluster is 0 (i.e., δ=0). Also embedded are clusters whose distance threshold among the objects is δ=2,4,6, . . . . Also generated are synthetic sequential datasets in the form of . . . (id,timestamp) . . . , where instead of embedding clusters, there are simply modeled the sequences by probabilistic distributions. Here, the ids are randomly generated; however, the occurrence rate of different ids follows either a uniform or a Zipf distribution. Generated are ascending timestamps in such a way that the number of elements in a unit window follows either uniform or Poisson distribution.

Gene expression data are presented as a matrix. The yeast microarray [15] can be converted to a weighted-sequence of 49,028 elements (2,884 genes under 17 conditions). The expression levels of the yeast genes (after transformation) range from 0-600, and they are discretized into 40 bins. The mouse cDNA array [10] is 535,766 in size (10,934 genes under 49 conditions) and it is pre-processed in the same way.

The data sets are taken from a production computer network at a financial service company. NETVIEW [14] has six attributes: Timestamp, EventType, Host, Severity, Interestingness, and DayOfWeek. Of import are attribute Timestamp and EventType, which has 241 distinctive values. TEC [14] has attributes Timestamp, EventType, Source, Severity, Host, and DayOfYear. In TEC, there are 75 distinctive values of EventType and 16 distinctive types of Source. It is often interesting to differentiate same type of events from different sources, and this is realized by combining EventType and Source to produce 75×16=1200 symbols.

By way of performance analysis, the scalability of the clustering algorithm on synthetic tabular datasets is evaluated, and compared with pCluster [16]. The number of objects in the dataset increases from 1,000 to 100,000, and the number of columns from 20 to 120. The results presented in FIG. 6(a)-6(c) are average response times obtained from a set of 10 synthetic data.

Figure 6A:
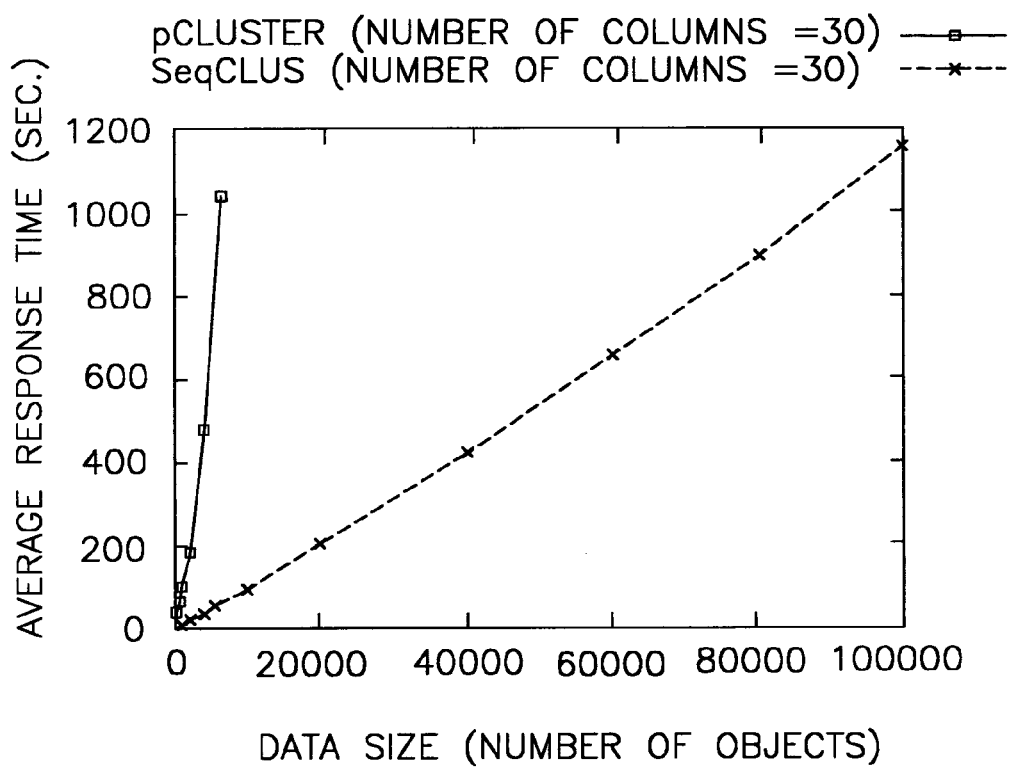
FIGS. 6($a$)-6($b$) are graphs relating to a performance study.

Data sets used for FIG. 6(a) are generated with number of columns fixed at 30. Embedded are a total of 10 perfect clusters (δ=0) in the data. The minimal number of columns of the embedded cluster is 6, and the minimal number of rows is set to 0.01N, where N is the number of rows of the synthetic data.

The pCluster algorithm is invoked with minCols=5, minRows=0.01N, and δ=3, and the SeqClus algorithm is invoked with δ=3. FIG. 6(a) shows that there is almost a linear relationship between the time and the data size for the SeqClus algorithm. The pCluster algorithm, on the other hand, is not scalable, and it can only handle datasets with size in the range of thousands.

Figure 6B:
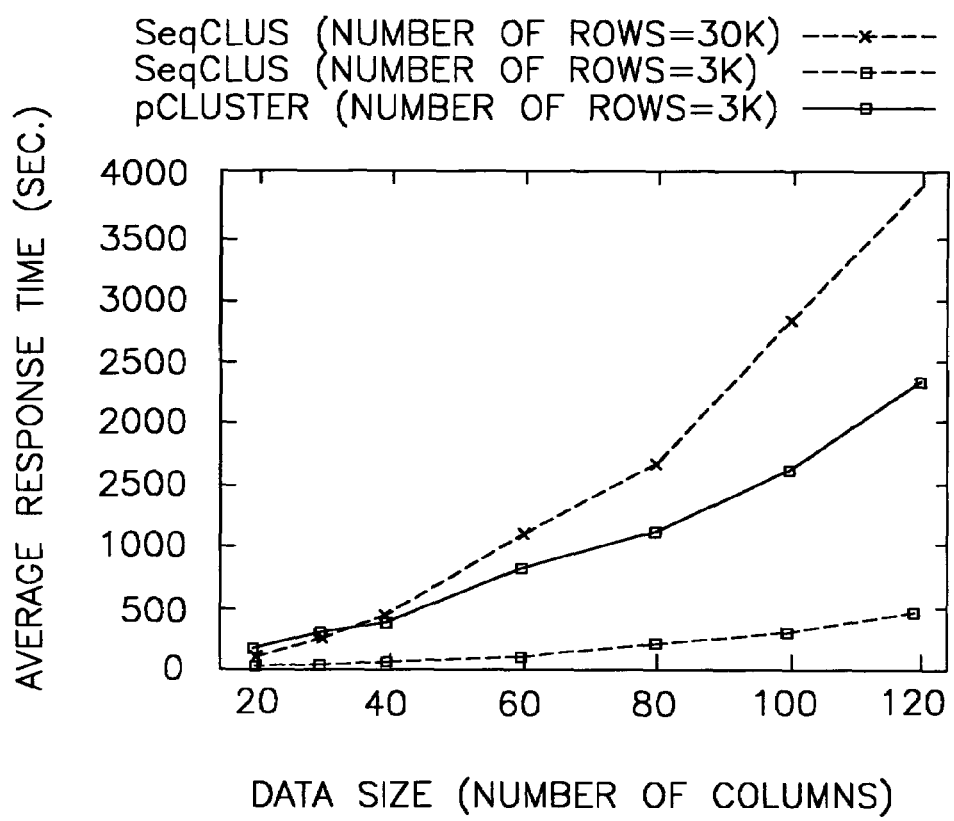

For FIG. 6(b), there is increased the dimensionality of the synthetic datasets from 20 to 120. Each embedded cluster is in subspace whose dimensionality is at least 0.02C, where C is the number of columns of the data set. The pCluster algorithm is invoked with δ=3, min Cols=0.02C, and minRows=30. The curve of SeqClus exhibits quadratic behavior. However, it shows that, with increasing dimensionality, SeqClus can almost handle datasets of size an order of magnitude larger than pCluster (30K vs. 3K).

Figure 7:
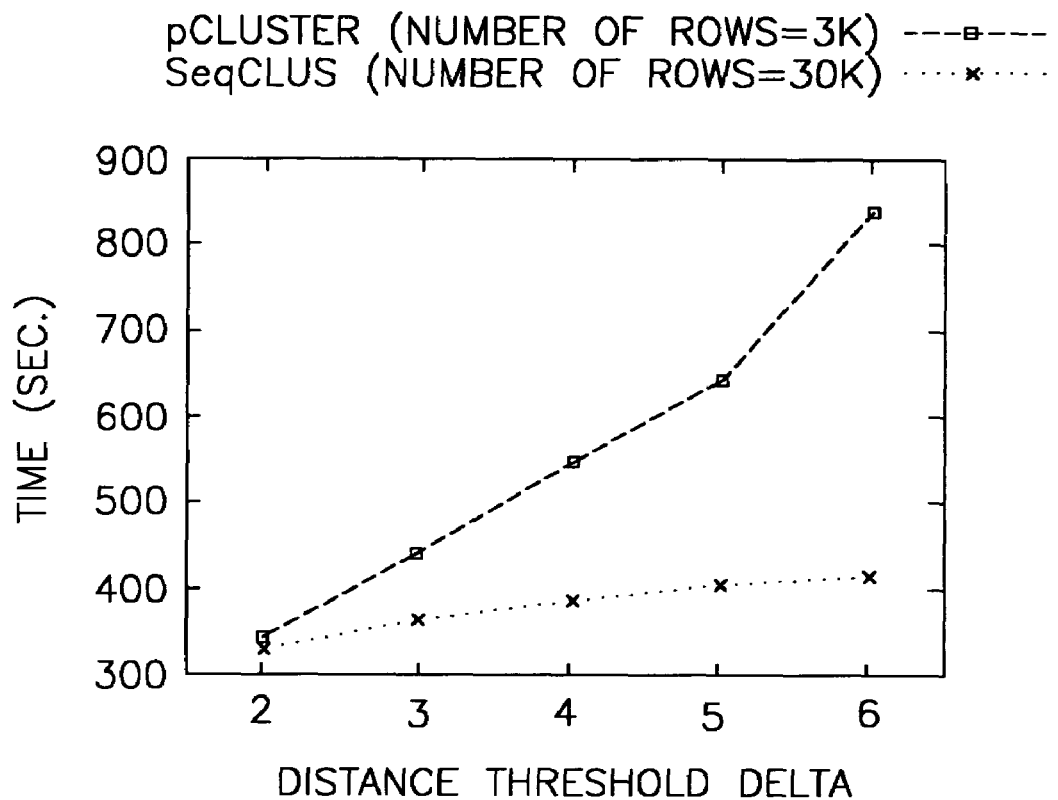
FIG. 7 is a graph of time vs. distance threshold.

Next, there is studied the impact of the quality of the embedded clusters on the performance of the clustering algorithms. There are generated synthetic datasets containing 3K/30K objects, 30 columns with 30 embedded clusters (each on average contains 30 objects, and the clusters are in subspace whose dimensionality is 8 on average). Within each cluster, the maximum distance (under the pCluster model) between any two objects ranges from δ=2 to δ=6. FIG. 7 shows that, while the performance of the pCluster algorithm degrades with the increase of δ, the SeqClus algorithm is more robust under this situation. The reason is because much of the computation of SeqClus is performed on the counting tree, which provides a compact summary of the dense patterns in the dataset, while for pCluster, a higher δ value has a direct, negative impact on its pruning effect [16].

Figure 8:
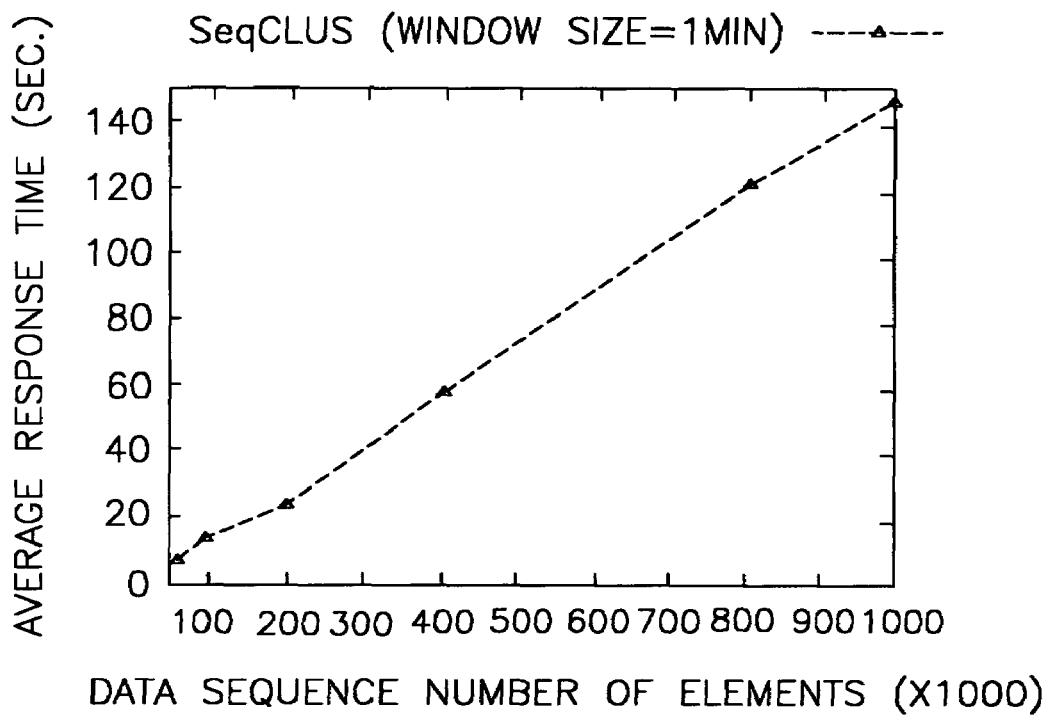
FIG. 8 is a graph illustrating scalability on a sequential dataset.

There is also studied clustering performance on timestamped sequential datasets. The dataset in use is in the form of . . . (id,timestamp) . . . , where every minute contains on average 10 ids (uniform distribution). There is placed a sliding window of size 1 minute on the sequence, and there is created a counting tree for the subsequences inside the windows. The scalability result is shown in FIG. 8. Also attempted were different distributions of id and timestamp, but there were not observed significant differences in performance.

With regard to cluster analysis, there are reported clusters found in real life datasets. Table 4 shows the number of clusters found by the pCluster and SeqClus algorithm in the raw Yeast micro-array dataset.

Figure 9:
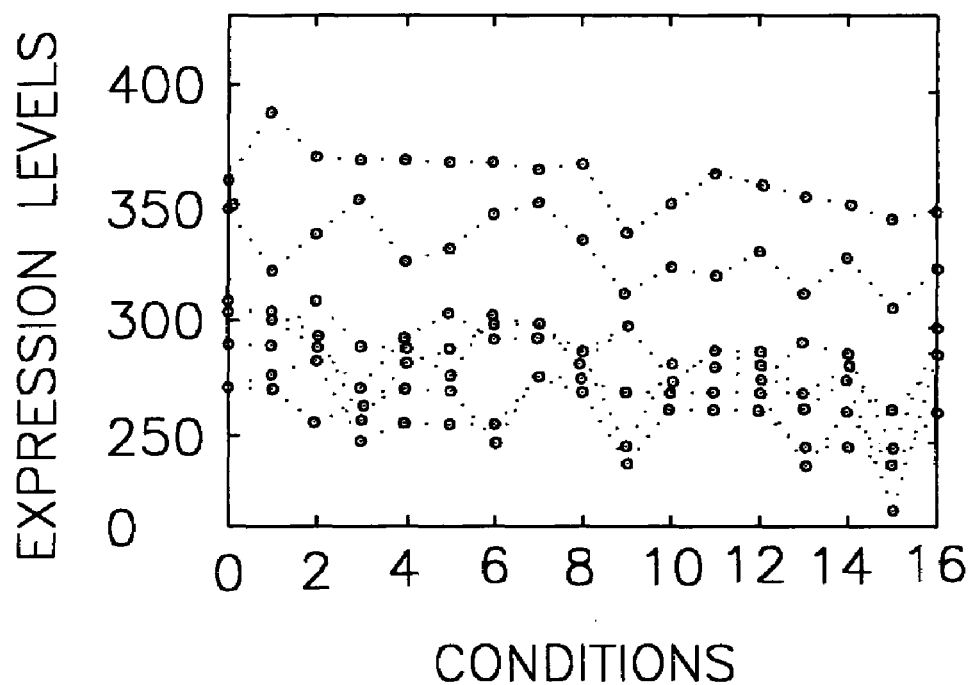

For minCols=9 and minRows=30, the two algorithms found the same clusters. But in general, using the same parameters, SeqClus produces more clusters. This is because the similarity measure used in the pCluster model is more restrictive. It is found that the objects (genes) in those clusters overlooked by the pCluster algorithm but discovered by the SeqClus method exhibit easily perceptible coherent patterns. For instance, the genes in FIG. 9 shows a coherent pattern in the specified subspace, and this subspace cluster is discovered by SeqClus but not by pCluster. This indicates the relaxation of the similarity model not only improves the performance but also provides extra insight in understanding the data.

The SeqClus algorithm works directly on both tabular and sequential datasets. Table 5 shows event sequence clusters found in the NETVIEW dataset [14]. The algorithm is applied on 10 days' worth of event logs (around 41 M bytes) of the production computer network.

Herebelow is a discussion of a comparison of SeqClus with previous approaches, while highlighting its advantage in discovering pattern similarity.

The pCluster algorithm [16] was among the first efforts to discover clusters based on pattern similarity. However, due to the limitation of the similarity model in use, neither the pCluster model, nor its predecessors, which include the bicluster [8], the δ-cluster [17], and their variations [13, 12], provide a scalable solution to discovering clusters based on pattern similarity in large datasets.

The distance function used in the pCluster model [16] for measuring the similarity between two objects x and y in a subspace $S \subseteq A$ can be expressed as follows:

$$dist_S(x, y) = \max_{i,j \in S} |(x_i - y_i) - (x_j - y_j)| \quad (3)$$

where $x_i$ is object x's value on coordinate i. A set of objects form a δ-pCluster if the distance between any of its two objects is less than δ.

The advantage of SeqClus over pCluster is due to the following two important differences between Eq (3) and Eq (1):

To compute the distance between two objects x and y, Eq (3) compares x and y for every two dimensions in S, while Eq (1) is linear in the size of S.

For pCluster, the fact that both {x.y} and {x,z} are δ-pClusters in S does not necessarily mean {x,y,z} is a δ-pCluster in S.

Because of this, pCluster resorts to a pair-wise clustering method consisting of two steps. First, it finds, for every two objects x and y, the subspaces in which they form a δ-cluster. The complexity of this process is $O(n^2)$. Second, it finds, for each subspace S, sets of objects in which each pair forms a δ-pCluster in S. This process is NP-complete, as it is tantamount to finding cliques (complete subgraphs) in a graph of objects (two objects are linked by an edge if they form a δ-pCluster in S).

Clearly, pCluster has scalability problems. Even if objects form only a sparsely connected graph, which makes the second step possible, the $O(n^2)$ complexity of the first step still prevents it from clustering large datasets.

Effectiveness Given that pCluster is computationally more expensive than SeqClus, does pCluster find more clusters or clusters of higher quality than SeqClus does? The answer is no. As a matter a fact, with a relaxed user-defined similarity threshold, SeqClus can find any cluster found by pCluster.

Property 2. The clusters found in a dataset by SeqClus with distance threshold 2δ contain all δ-pClusters.

Proof

It is easy to see that $dist_S(x,y) \leq \delta \Rightarrow \exists k$ such that $dist_{k,S}(x,y) \leq 2\delta$ Property 1 establishes a semi-equivalence between Eq (3) and Eq (1). But the latter is conducive to a much more efficient way of implementation. Furthermore, SeqClus can find meaningful clusters that pCluster is unable to discover (e.g., the cluster in FIG. 9) since pCluster's pair-wise model is often times too rigid.

In many applications, for instance, system management, where one monitors various system events, data are coming in continuously in the form of data streams. Herebelow is a discussion of how to adapt our algorithm to the data stream environment.

The main data structure for clustering by pattern similarity is the counting tree. In order support data insertion and data deletion dynamically, one needs to support dynamic labeling. Recall that a node is labeled by a triple: $(ID^-, ID^-, Count)$. The IDs are assigned by a depthfirst traversal of the tree structure, during which we assign sequential numbers (starting form 0, which is assigned to the root node) to the nodes as they are encountered one by one. It is clear to see that such a labeling schema will prevent dynamic data insertion and deletion. One must instead pre-allocate space for future insertions. In order to do this, one can rely on an estimated probability distribution of the data. More specifically, one needs to estimate the probability $p(c_i = v_i | c_{i-1} = v_{i-1})$, which can be derived from data sampling or domain knowledge. One then uses such probability to pre-allocate label spaces.

In addition, one needs to keep dynamic counts of candidate clusters. This can be achieved by checking whether the incoming data are instances of any particular clusters we are keeping track of multiple index structures.

In this vein, incremental index maintenance might be costly if the data arrival rate is high. In the data stream environment, one will be interested to find out the clusters in the most recent window of size T. One can still perform clustering in the batch mode on data chunks of a fixed size τ. The clustering however, will use a reduced threshold of δ×τ/T. We combine the clusters found in different chunks to form the final clusters of the entire window. The benefits of this approach is that at any point of time, one only need worry about the data chunks that are moving into or out of the window; thus, one will not incur global changes on the index structure.

By way of recapitulation and conclusion, clustering by pattern similarity is an interesting and challenging problem. The computational complexity problem of subspace clustering is further aggravated by the fact that one is generally concerned with patterns of rise and fall instead of value similarity. The task of clustering by pattern similarity can be converted into a traditional subspace clustering problem by (i) creating a new dimension ij for every two dimension i and j of any object x, and set $x_{ij}$, the value of the new dimension, to $x_i - x_j$; or (ii) creating |A| copies (A is the entire dimension set) of the original dataset, where $x_k$, the value of x on the k th dimension in the i th copy is changed to $x_k - x_i$, for $k \in A$. For both cases, we need to find subspace clusters in the transformed dataset, which is |A| times larger.

It is to be understood that the present invention, in accordance with at least one presently preferred embodiment, includes an arrangement for accepting input data, an arrangement for discerning pattern similarity in the input data, and an arrangement for clustering the data on the basis of discerned pattern similarity. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] Alison Abbott. Bioinformatics institute plans public database for gene expression data. Nature, 398:646, 1999.
[2] C. C. Aggarwal, C. Procopiuc, J. Wolf, P. S. Yu, and J. S. Park. Fast algorithms for projected clustering. In *SIGMOD*, 1999.
[3] C. C. Aggarwal and P. S. Yu. Finding generalized projected clusters in high dimensional spaces. In *SIGMOD*, pages 70-81, 2000.
[4] R. Agrawal, J. Gehrke, D. Gunopulos, and P. Raghavan. Authomatic subspace clustering of high dimensional data for data mining applications. In *SIGMOD*, 1998.
[5] Alvis Brazma, Alan Robinson, Graham Cameron, and Michael Ashburner. One-stop shop for microarray data. Nature, 403:699-700, 2000.
[6] P. O. Brown and D. Botstein. Exploring the new world of the genome with DNA microarrays. *Nature Genetics*, 21:33-37, 1999.
[7] C. H. Cheng, A. W. Fu, and Y. Zhang. Entropy-based subspace clustering for mining numerical data. In *SIGKDD*, pages 84-93, 1999.
[8] Y. Cheng and G. Church. Biclustering of expression data. In *Proc. of 8th* International Conference on Intelligent System for *Molecular Biology*, 2000.
[9] P. D'haeseleer, S. Liang, and R. Somogyi. Gene expression analysis and genetic network modeling. In Pacific Symposium on Biocomputing, 1999.
[10] R. Miki et al. Delineating developmental and metabolic pathways in vivo by expression profiling using the riken set of 18,816 full-length enriched mouse cDNA arrays. In *Proceedings of National Academy of Sciences*, 98, pages 2199-2204, 2001.
[11] H. V. Jagadish, Jason Madar, and Raymond Ng. Semantic compression and pattern extraction with fascicles. In *VLDB*, pages 186-196, 1999.
[12] Jinze Liu and Wei Wang. Op-cluster: Clustering by tendency in high dimensional space. In Submitted for review, 2003.
[13] Jian Pei, Xiaoling Zhang, and Moonjung Cho. Maple: A fast algorithm for maximal pattern-based clustering. In Submitted for review, 2003.
[14] Chang-Shing Perng, Haixun Wang, Sheng Ma, and Joseph L Hellerstein. A framework for exploring mining spaces with multiple attributes. In *ICDM*, 2001.
[15] S. Tavazoie, J. Hughes, M. Campbell, R. Cho, and G. Church. Yeast micro data set. In http://iarep.med.harvard.edu/biclustering/yeast.matrix, 2000.
[16] Haixun Wang, Wei Wang, Jiong Yang, and Philip S. Yu. Clustering by pattern similarity in large data sets. In *SIGMOD*, 2002.
[17] Jiong Yang, Wei Wang, Haixun Wang, and Philip S Yu. δ-clusters: Capturing subspace correlation in a large data set. In *ICDE*, pages 517-528, 2002.

APPENDIX

TABLE 1

Expression data of Yeast genes

| | CH1I | CH1B | CH1D | CH2I | CH2B | ... |
|---|---|---|---|---|---|---|
| VPS8 | 401 | 281 | 120 | 275 | 298 | |
| SSA1 | 401 | 292 | 109 | 580 | 238 | |
| SP07 | 228 | 290 | 48 | 285 | 224 | |
| EFB1 | 318 | 280 | 37 | 277 | 215 | |
| MDM10 | 538 | 272 | 266 | 277 | 236 | |
| CYS3 | 322 | 288 | 41 | 278 | 219 | |
| DEP1 | 317 | 272 | 40 | 273 | 232 | |
| NTG1 | 329 | 296 | 33 | 274 | 228 | |

TABLE 2

A Stream of Events

| Event | Timestamp |
|---|---|
| . | . |
| . | . |
| . | . |
| CiscoDCDLinkUp | 19:08:01 |
| MLMSocketClose | 19:08:07 |
| MLMStatusUp | 19:08:21 |
| . | . |
| . | . |
| MiddleLayerManagerUp | 19:08:37 |
| CiscoDCDLinkUp | 19:08:39 |
| . | . |
| . | . |

TABLE 3

A dataset of 3 objects

| | $c_1$ | $c_2$ | $c_3$ | $c_4$ |
|---|---|---|---|---|
| x | 4 | 3 | 0 | 2 |
| y | 3 | 4 | 1 | 3 |
| z | 1 | 2 | 3 | 1 |

TABLE 4

Clusters found in the Yeast dataset

| | | | # of clusters | |
|---|---|---|---|---|
| δ | minCols | minRows | pCluster | SeqClus |
| 0 | 9 | 30 | 5 | 5 |
| 0 | 7 | 50 | 11 | 13 |
| 0 | 5 | 30 | 9370 | 11537 |

TABLE 5

Clusters found in NETVIEW

| δ | # events | # sequences | SeqClus |
|---|---|---|---|
| 2 sec | 10 | 500 | 81 |
| 4 sec | 8 | 400 | 143 |
| 6 sec | 5 | 300 | 2276 |

---

Algorithm 1: Build the Counting Tree

---

Input: D: a dataset in multidimensional Space A
ξ: minimal pattern length (dimensionality)
Output: F: a counting tree
F ← empty tree;
for all objects $x \in D$ do
    i ← 1;
    while i < |A| - ξ + 1 do
        insert $x^i$ into F;
        i ← i + 1;
make a depth-first traversal of F;
for each node s encountered in the traversal do
    let s represents sequence element $x_j - x_i = v$;
    label node s by [$id_s^\vdash$, $id_s^\dashv$, count];
    lent ← count of the last element in list ($c_i, c_j, v$), or 0 if ($c_i, c_j, v$) is empty;
    append [$id_s^\vdash$, $id_s^\dashv$, count + lent] to list ($c_i, c_j, v$);

---

Algorithm 2: Algorithm count()

---

Input: Q: a query pattern on dataset D
F: The counting tree of D
Output: number of occurrences of Q in D
assume Q = (($q_1$, 0)), ($q_2$, $v_2$), . . . , ($q_j$, $v_j$), . . .);
(r, cnt) ← count(Universe, $q_1$, 0);
return countPattern(r, 2);
Function countPattern(r, j)
the $j^{th}$ element if Q is ($q_j$, $v_j$);
(L, cnt) ← count(r, $q_j$, $v_j$);
if j = |Q| then
    return cnt;
else
    return $\sum_{r' \in L}$ countPattern(r', j + 1)
end
Function count(r, c, v)
cl ← the counting list for ($q_1$, c, v);
perform range query r on cl and assume cl contain the following elements:
. . . , (_, _, cnt'), $\underbrace{(id_j^\vdash, id_j^\dashv, cnt_j), \ldots, (id_k^\vdash, id_k^\dashv, cnt_k)}_{r}, \ldots$ return (L, cnt) where:
cnt = $cnt_k$ - cnt';
L = {[$id_j^\vdash$, $id_j^\dashv$], . . . , [$id_k^\vdash$, $id_k^\dashv$]};

---

Algorithm 3: Clustering Algorithm

---

Input: minCols: dimensionality threshold
minRows: cluster size threshold
F: tree structure for D
Output: clusters of objects in D
T ← create root note of tree;
Queue ← ∅;
for i = 1 to |A|-minCols do
    (cnt, L) ← count(NULL, $C_i$, 0);
    if cnt ≥ minCols then
        insert ($c_i$, 0, cnt, L) under T and into Queue;
    end
end
while Queue ≠ ∅ do
    remove the 1st element x from Queue;
    assume x = ($c_i$, v, cnt, L);
    join x with eligible node y = ($c_j$, v', cnt', L');
    (cnt", L") ← count(L, $C_j$, v);
    if cnt" ≥ minRows then
        Insert ($c_j$, v", cnt", L") under x and into Queue;
    end
end
for each leaf node x of the tree do
    assume x = ($c_i$, v, cnt, L);
    colums ← path from root to x;
    objects ← find All(L);
    return cluster {columns, objects};
end

---

What is claimed is:

1. An apparatus for facilitating subspace clustering, said apparatus comprising:

a processor;

an arrangement for accepting input data;

an arrangement for discerning pattern similarity in the input data, wherein said discerning arrangement is configured to:

define a pattern space;

divide the pattern space into grids;

establish a grid of cells corresponding to the input data; and construct a tree structure which summarizes frequent patterns discerned among the input data, wherein said tree structure is configured to determine at least one of:

a number of occurrences of a given pattern; and a density of any cell in the grid of cells; and an arrangement for clustering the input data on the basis of discerned pattern similarity, wherein said clustering arrangement is configured to merge cells of at least a threshold density into clusters;

said arrangement for discerning pattern similarity comprising an arrangement for discerning pattern similarity among both tabular data and sequential data contained in the input data, wherein said tabular data is transformed and represented as sequential data;

wherein said arrangement for discerning pattern similarity is configured to employ a distance function for determining a sequence-based distance between data objects, the distance function comprising:

given two data objects x and y, a subspace S, and a dimension k∈S, the sequence-based distance between x and y is as follows:

$$dist_{k,S}(x, y) = \max_{i \in S} |(x_i - y_i) - (x_k - y_k)|; \text{ and}$$

wherein the clustered input data is stored in a computer memory.

2. A method of facilitating subspace clustering, said method comprising the steps of:
(a) accepting input data;
(b) discerning pattern similarity in the input data, said discerning step comprising:
defining a pattern space;
dividing the pattern space into grids;
establishing a grid of cells corresponding to the input data; and
constructing a tree structure which summarizes frequent patterns discerned among the input data, wherein said step of constructing a tree structure comprises determining at least one of:
a number of occurrences of a given pattern; and
a density of any cell in the grid of cells; and
(c) clustering the input data on the basis of discerned pattern similarity, wherein said step of clustering the input data comprises merging cells of at least a threshold density into clusters;
said discerning step comprising discerning pattern similarity among both tabular data and sequential data contained in the input data, wherein said tabular data is transformed and represented as sequential data;
wherein said discerning pattern similarity in the input data comprises employing a distance function for determining a sequence-based distance between data objects, the distance function comprising:
given two data objects x and y, a subspace S, and a dimension k∈S, the sequence-based distance between x and y is as follows:

$$dist_{k,S}(x, y) = \max_{i \in S} |(x_i - y_i) - (x_k - y_k)|; \text{ and}$$

wherein the clustered input data is stored in a computer memory.

3. A program storage device readable by machine, tangibly embodying a program of instructions executable by the machine to perform method steps for facilitating subspace clustering, said method comprising the steps of:
(a) accepting input data;
(b) discerning pattern similarity in the input data, said discerning step comprising:
defining a pattern space;
dividing the pattern space into grids;
establishing a grid of cells corresponding to the input data; and
constructing a tree structure which summarizes frequent patterns discerned among the input data, wherein said step of constructing a tree structure comprises determining at least one of:
a number of occurrences of a given pattern; and
a density of any cell in the grid of cells; and
(c) clustering the input data on the basis of discerned pattern similarity, wherein said step of clustering the input data comprises merging cells of at least a threshold density into clusters;
said discerning step comprising discerning pattern similarity among both tabular data and sequential data contained in the input data, wherein said tabular data is transformed and represented as sequential data;
wherein said discerning pattern similarity in the input data comprises employing a distance function for determining a sequence-based distance between data objects, the distance function comprising:
given two data objects x and y, a subspace S,. and a dimension k∈S, the sequence-based distance between x and y is as follows:

$$dist_{k,S}(x, y) = \max_{i \in S} |(x_i - y_i) - (x_k - y_k)|.$$

* * * * *